(12) United States Patent
Colby et al.

(10) Patent No.: US 6,298,297 B1
(45) Date of Patent: Oct. 2, 2001

(54) SLIP BASED THROTTLE PROGRESSION MODIFIER

(75) Inventors: Stephen E. Colby, Grand Ledge; Paul A. Bauerle, Fenton, both of MI (US)

(73) Assignee: Generals Motors Corporation, Detroit, MI (US)

(*) Notice: Subject to any disclaimer, the term of this patent is extended or adjusted under 35 U.S.C. 154(b) by 0 days.

(21) Appl. No.: 09/548,766

(22) Filed: Apr. 13, 2000

(51) Int. Cl.[7] .................................................. G05D 29/00
(52) U.S. Cl. ............................... 701/85; 701/82; 701/84; 701/87
(58) Field of Search .................................. 701/84, 85, 82, 701/87, 70, 71, 99; 180/197; 477/34, 48, 42, 43

(56) References Cited

U.S. PATENT DOCUMENTS 5,765,657 * 6/1998 Fukumura et al. .................. 180/197
5,991,682 * 11/1999 Ishizu ..................................... 701/84
6,148,784 * 11/2000 Masberg et al. ...................... 123/192

* cited by examiner

Primary Examiner—William A. Cuchlinski, Jr.
Assistant Examiner—Marthe Y. Marc-Coleman
(74) Attorney, Agent, or Firm—Anthony Luke Simon

(57) ABSTRACT

A control system for adjusting a throttle progression curve to compensate for traction slip calculates a maximum vehicle acceleration value based on wheel torque and vehicle speed conditions, then compares the actual vehicle acceleration to determine if it is greater than the maximum acceleration to determine if slip is detected, and adjust a throttle progression curve based on the results of the comparing step to enable the vehicle to learn the current road conditions and reduce the throttle progression for a given pedal position during slippery conditions to reduce the amount of slip that occurs during future accelerations.

24 Claims, 2 Drawing Sheets

SLIP BASED THROTTLE PROGRESSION MODIFIER

FIELD OF THE INVENTION

The present invention relates to a control system for adjusting a throttle progression curve to compensate for traction slip.

BACKGROUND OF THE INVENTION

Current vehicles with traction control monitor wheel slip and will reduce engine power if the amount of slip exceeds calibrated limits. These control systems treat each slip event as a separate entity and do not learn from past events. In these systems, slip occurs before the control system can respond. Traction control systems that monitor wheel slip are therefore considered to be reactive systems, since the systems react to the slip event when detected.

SUMMARY OF THE INVENTION

It would be desirable to provide a control system to compensate for traction slip in an active manner by "learning" the road conditions before the next acceleration event. The known traction control systems reduce torque to the driven wheels after an excessive amount of wheel slip is detected, which results in a momentary loss of traction before the traction system responds. The present invention uses past wheel slip events to adjust the throttle progression curve for future accelerations. The present invention therefore is an active control system, as opposed to a reactive traction control system. The present invention allows the traction control system to learn the current road conditions and to adjust the vehicle acceleration response accordingly. If slippery conditions exist, the throttle output for a given pedal displacement will be reduced. It will then be increased toward a normal throttle output for a given pedal displacement as non-slippery road conditions are encountered. The present invention provides a control system which adapts the throttle progression curve to the current road conditions in electronic throttle control vehicles. If vehicle acceleration or wheel slip exceeds calibrated limits, a zero to one throttle area modifier is decremented to reduce the throttle progression curve for a given pedal position. This will then decrease the response of the engine until the system operates for an extended period of time without slip. If wheel slip continues to occur, the throttle progression modifier can continue to be decreased. The control system enables the vehicle to "learn" the current road conditions and reduce the response to driver pedal input during slippery conditions to reduce the amount of slip that occurs on accelerations. The control system according to the present invention enables the vehicle to adapt throttle response to changing road conditions. The vehicle "learns" what current traction capacity exists and responds accordingly. The present control system is able to change the response of the engine before subsequent loss of traction events occur. The vehicle is not required to possess a traction control system in order to incorporate this technology. The control system can adapt to slippery roads and reduce the engine torque on subsequent accelerations.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

The present invention provides a means for adapting the throttle progression curve to the current road conditions. The present invention is not meant to provide immediate traction control. The present invention is a long term attempt to provide traction control for the vehicle in response to current road conditions by learning what has occurred over several vehicle acceleration launch cycles.

Figure 1:
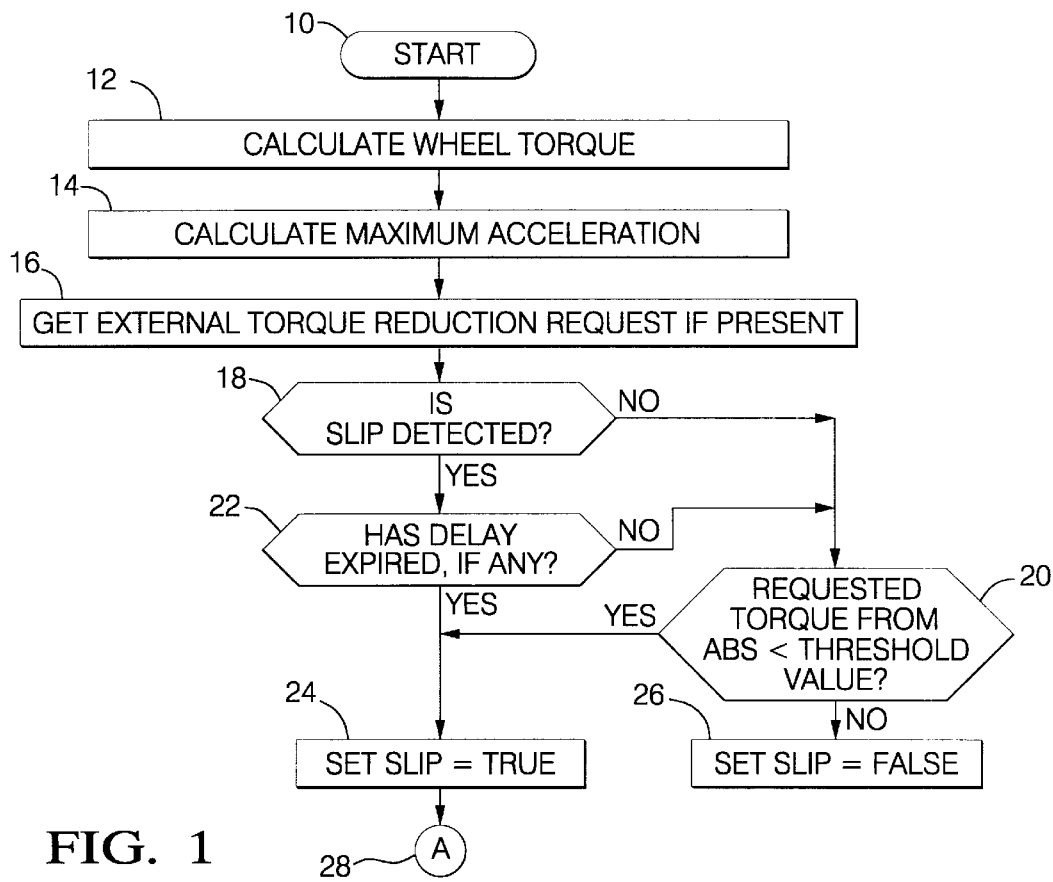
FIG. 1 is a first portion of a simplified flow diagram of a control system for adjusting a throttle progression curve to compensate for traction slip according to the present invention.

Referring now to FIG. 1, the control system according to the present invention begins at step 10 and continues to step 12 where the wheel torque is calculated from the engine brake torque and n/v ratio. After calculating the wheel torque in step 12, the maximum acceleration is calculated in step 14 which preferably includes an offset value corresponding to the wheel torque and vehicle speed conditions currently existing. After the maximum acceleration is calculated in step 14, the control system gets an external torque reduction request from an anti-lock brake system (ABS) module, if present, in step 16. The control system program then continues to query 18 to determine if slip has been detected by comparing the actual vehicle acceleration to determine if it is greater than the maximum acceleration calculated in step 14. If no slip is detected in response to query 18, the control system program continues to query 20, where it is determined if the requested torque reduction from the anti-lock brake system module is less than a threshold value. If slip is detected in response to query 18, the control system program continues to query 22, where it is determined if a predetermined slip delay time period has expired. If the delay time period has not expired in response to query 22, the program branches to query 20 to determine if the requested torque from the ABS module is less than a threshold value. If the delay time period has expired in response to query 22, the program continues to set the wheel-slip-occurring value equal to true in step 24. If the requested torque from the anti-lock brake system module is less than the threshold value, the control program branches to step 24, where the wheel-slip-occurring value is set equal to true. If the requested torque from the anti-lock system brake module is not less than the threshold value, the control program continues to step 26, where the wheel-slip-occurring value is set equal to false. After performing either step 24, or step 26, to set the wheel-slip-occurring value, the control system program continues and branches to Point A, labeled as 28, indicating a point of transition between FIG. 1 and FIG. 2 of the drawing figures for the present invention.

Figure 2:
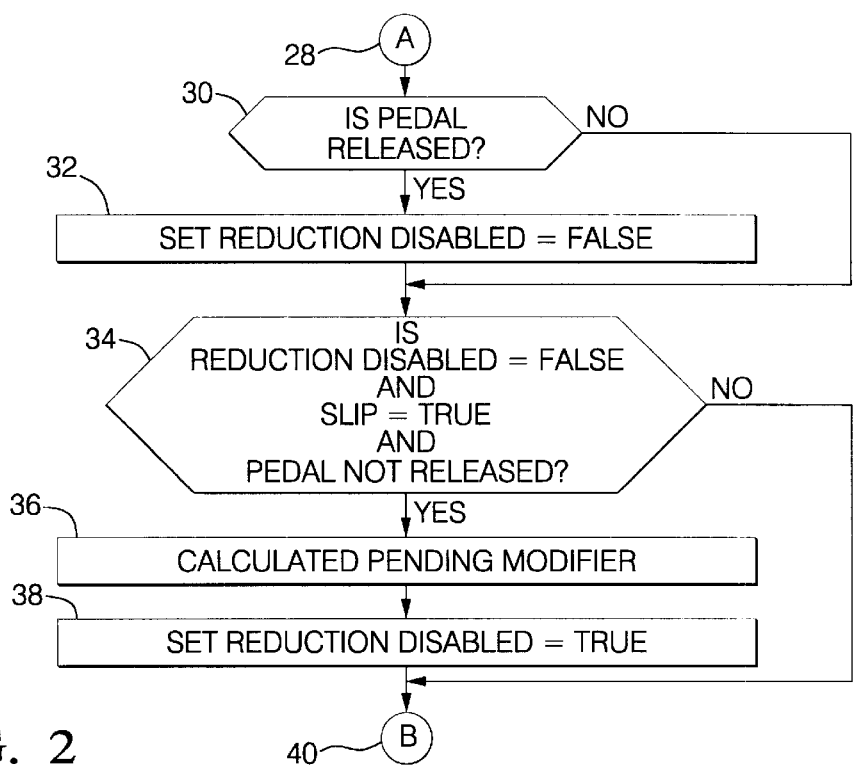
FIG. 2 is a second portion of a simplified flow diagram of the control system according to the present invention.

Referring now to FIG. 2, after setting the wheel-occurring-slip value in step 24 or step 26, the control system program continues to query 30, where it is determined if the pedal is in the released position, referred to herein as a zero position. If the pedal has been released and returned to the home position, the control program continues to step 32, where the wheel-slip-reduction-disabled value is set equal to false. If the acceleration pedal has not been released, the control system program branches to bypass step 32 and continues on to query 34. After the wheel-slip-reduction-disabled value has been set to false in step 32, or step 32 has been bypassed, query 34 determines if the wheel-slip-reduction-disabled value is equal to false, and if the wheel-slip-occurring value is set equal to true, and if the acceleration pedal position is greater than zero. If the answer to each of the questions is yes, the control system program continues to step 36, where the pending throttle area modifier is calculated by subtracting an amount that is a function of pedal position, and limiting the result to a minimum threshold value, if necessary After calculating the pending modifier in step 36, the control system program continues to step 38, where the wheel-slip-reduction-disabled value is set equal to true. If the answer to any of the questions in query 34 is no, the control system program branches to bypass step 36 and step 38, and continues to Point B labeled as numeral 40, indicating a transition of the flow diagram between FIG. 2 and FIG. 3.

Figure 3:
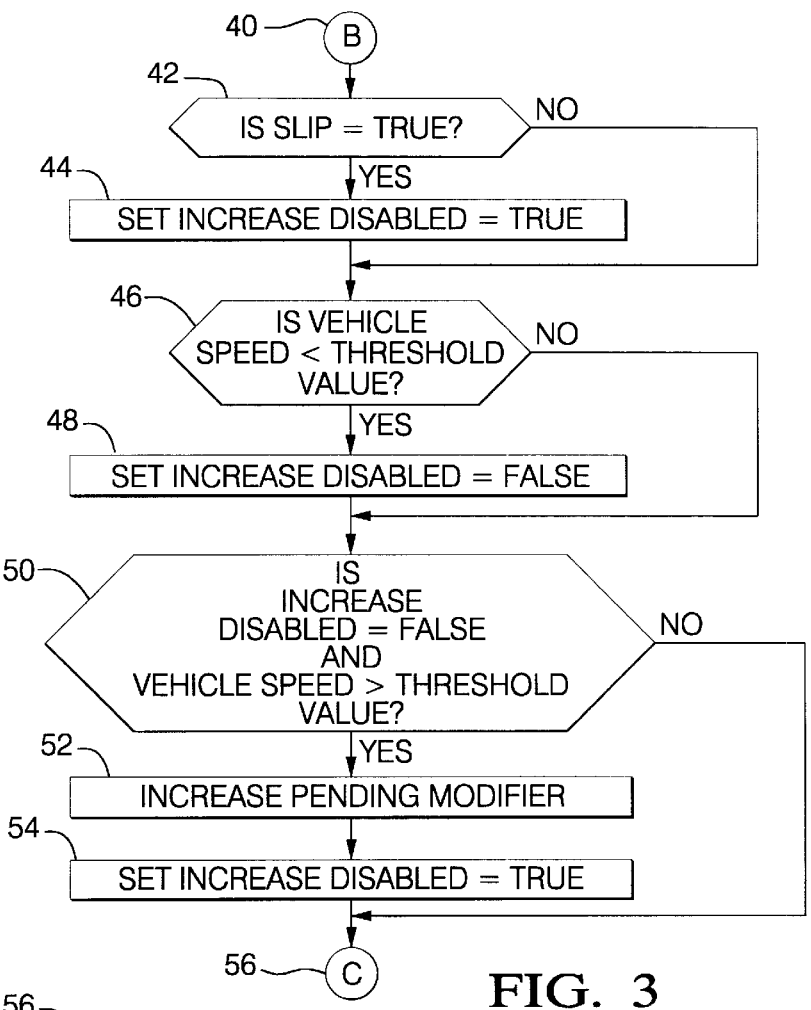
FIG. 3 is a third portion of a simplified flow diagram of the control system according to the present invention.

Referring now to FIG. 3, after the wheel-slip-reduction-disabled value has been set equal to true in step 38, or step 36 and 38 have been bypassed in response to a negative answer to one of the questions in query step 34, the control system program continues to query 42, where it is determined if the wheel-slip-occurring value has been set equal to true. If the wheel-slip-occurring value is set equal to true in response to query 42, the control system program continues to step 44 to set the wheel-slip-increase-disabled value equal to true. If the wheel-slip-occurring value is not equal to true, the program branches to bypass step 44 and continues to query 46, where it is determined if the vehicle speed is less than a threshold value. After setting the wheel-slip-increase-disabled value equal to true in step 44, the program also continues on to query 46. In query 46, if the vehicle speed is less than a threshold value, the control system program continues to step 48 where the wheel-slip-increase-disabled value is set equal to false. If the vehicle speed is not less than a threshold value in response to query 46, the control system program branches to bypass step 48 and continues to query 50. After performing step 48, or bypassing step 48 in response to query 46, the control system program continues to step 50, where it is determined if the wheel-slip-increase-disabled value is equal to false and if the vehicle speed is greater than a threshold value. If the answer to both questions in query 50 is yes, the control system program continues to step 52 to increase the pending throttle area modifier once, if no slip has occurred during this vehicle acceleration cycle. The pending modifier is increased by a predetermined incremental step. After increasing the pending modifier in step 52, the control system program continues to step 54 to set the wheel-slip-increase-disabled value equal to true. If the answer to either question in query 50 is no, the control system program branches to bypass step 52 and step 54, and continues to Point C labeled as numeral 56. Point C indicates a transition between FIGS. 3 and 4 of the flow diagram for the control system program according to the present invention.

Figure 4:
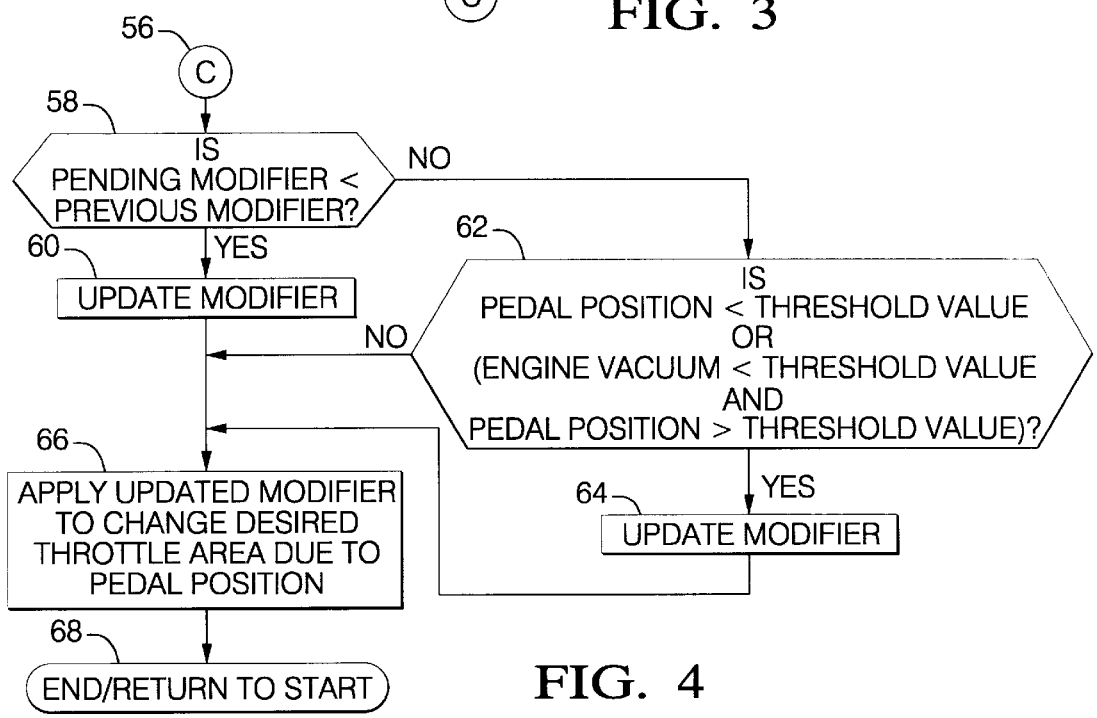
FIG. 4 is a fourth portion of a simplified flow diagram for the control system according to the present invention.

Referring now to FIG. 4, after performing step 52 and step 54, or bypassing step 52 and 54 in response to query 50, the control system program continues to query 58, where it is determined if the pending modifier is less than the previous modifier stored in nonvolatile memory. If the pending modifier is less than the previous modifier in response to query 58, the control system program continues to step 60 to update the modifier in nonvolatile memory to be equal to the pending modifier. If the pending modifier is not less than the previous modifier in response to query 58, the control system program branches to query 62 to determine if the pedal position is less than a first threshold value, or if both the pedal position is greater than a second threshold value and the engine vacuum is less than a threshold value. Preferably, the threshold value for the engine vacuum is determined from a look up table based on revolutions per minute (rpm) of the engine. If the answer to query 62 is yes, the control system program continues to step 64 where the modifier in nonvolatile memory is updated to equal the pending modifier value. Query 62 is performed if the modifier is increasing to delay the update of the modifier until the pedal position is in a predetermined low position, or until both the pedal position is in a predetermined high position and the engine vacuum indicates that the throttle is near a wide open position. This is desirable in order to avoid a sudden increase in the throttle. The control system program delays the update until either the pedal position is low (adjacent the home or zero position), or both the pedal position is high (adjacent the full open throttle position) and the engine vacuum is low, before performing the update so that the adjustment will not be noticed by the vehicle operator. If the answer to query 62 is no, the control system program branches to bypass the update step, so that the modifier stored in nonvolatile memory remains the same. After performing the update in step 60, or the update in step 64, or bypassing both update steps in response to query 62, the control system program continues to step 66 where the modifier stored in nonvolatile memory is applied to change the desired throttle area due to pedal position. After applying the new modifier stored in nonvolatile memory, the control program continues to step 68 where the program ends, or returns to the start step 10.

By way of example and not limitation, if vehicle acceleration is greater than a predetermined value from a look up table, and for a calibratable amount of time, a new modifier to the throttle area modifier would be decremented by an amount from a look up table based on pedal position. This can also be triggered by an anti-lock braking system torque request which is less than a threshold value, which is also indicative of slip. Subsequent reductions in the throttle area modifier could not occur until the pedal position has first returned to a zero position followed by another condition where vehicle acceleration is greater than a predetermined value from a look up table. This mode of operation is preferable in order to provide a certain amount of dynamic stability in the system. Preferably, there would be an absolute minimum value for the throttle area modifier, so that there would always be some throttle reaction even on the lowest friction surfaces. The new modifier is preferably stored in nonvolatile memory, and initializes to 1.0 after any nonvolatile memory failure. This allows the system to remember road conditions from prior ignition events. By way of example and not limitation, the throttle area modifier is incremented in the following manner. The throttle area modifier incremention program according to the present invention is armed in response to vehicle speed being less than a threshold value, by way of example and not limitation, for example 2 miles per hour (mph). If the vehicle speed rises above a threshold value, by way of example and not limitation, for example 40 mph, and the slip limit has not been exceeded, the throttle area modifier is allowed to increment an amount equal to a predetermined value, by way of example and not limitation, for example 0.05. The throttle area modifier can not be incremented again until it has been armed again by the vehicle speed decreasing below the initial arming threshold of 2 mph in the example given above. Decrementing the throttle area modifier value can be done immediately, while incrementing of the throttle area modifier is performed when the pedal position is less than a first threshold value, or both the pedal position is greater than a second threshold value and the engine vacuum is less than a threshold value. This limitation is provided to prevent unexpected accelerations.

What is claimed is:

1. A control system for adjusting a throttle progression curve to compensate for traction slip comprising the steps of:
   calculating a maximum acceleration rate based on a calculated wheel torque value and current vehicle speed conditions;
   comparing the maximum acceleration rate to an actual vehicle acceleration rate to determine if slip is occurring; and
   adjusting a throttle progression curve based on results of the comparing step to adjust engine power for a given acceleration pedal position based on recurring slip conditions.

2. The control system of claim 1 further comprising the steps of:
   obtaining an external torque reduction request value from an antilock brake system module;
   comparing the external torque reduction request value to a threshold value; and
   setting a wheel-slip-occurring value based on the results of the comparing step.

3. The control system of claim 1 where the step of adjusting the throttle progression curve further comprises the steps of:
   calculating a pending throttle area modifier; and
   updating a previous throttle area modifier value with the pending throttle area modifier.

4. The control system of claim 3 further comprising the step of:
   storing the updated throttle area modifier in nonvolatile memory.

5. The control system of claim 3 further comprising the step of:
   basing the calculated pending throttle area modifier on a previous throttle area modifier value and a current pedal position; and
   limiting the calculated pending throttle area modifier to be not less than a predetermined minimum value.

6. The control system of claim 3 where the step of updating the previous throttle area modifier further comprises the steps of:
   if the pending throttle area modifier is less than the previous throttle area modifier, updating the previous throttle area modifier value with the pending throttle area modifier value;
   if the pending throttle area modifier is not less than the previous throttle area modifier, updating the throttle area modifier if the pedal position is less than a first predetermined threshold value; and
   if the pending throttle area modifier is not less than the previous throttle area modifier and the pedal position is not less than the first predetermined threshold value, updating the throttle area modifier if both the pedal position is greater than a second predetermined threshold value and the engine vacuum is less than a third predetermined threshold value.

7. The control system of claim 3 where the step of adjusting the throttle progression curve further comprises the steps of:
   if slip is not occurring during the comparing step, basing the calculated throttle area modifier on a previous throttle area modifier value plus a predetermined incremental increase value.

8. The control system of claim 7 where the step of updating the previous throttle area modifier further comprises the steps of:
   updating the throttle area modifier if the pedal position is less than a first predetermined threshold value; and
   if the pedal position is not less than the first predetermined threshold value, updating the throttle area modifier if both the pedal position is greater than a second predetermined threshold value and the engine vacuum is less than a third predetermined threshold value.

9. The control system of claim 1 further comprising the step of:
   limiting the adjusting step to only one adjustment per acceleration cycle.

10. The control system of claim 9 further comprising the step of:
    enabling another adjusting step after the acceleration pedal has returned to a rest position.

11. The control system of claim 1 further comprising the step of:
    determining if slip has occurred for a predetermined period of time prior to adjusting the throttle progression curve.

12. The control system of claim 1 further comprising the step of:
    setting a predetermined minimum throttle progression curve.

13. A control system for adjusting a throttle progression curve to compensate for traction slip comprising:
    means for calculating a maximum acceleration rate based on a calculated wheel torque value and current vehicle speed conditions;
    means for comparing the maximum acceleration rate to an actual vehicle acceleration rate to determine if slip is occurring; and
    means for adjusting a throttle progression curve based on results of the means for comparing to adjust engine power for a given acceleration pedal position based on recurring slip conditions.

14. The control system of claim 13 further comprising:
    means for obtaining an external torque reduction request value from an antilock brake system module;
    means for comparing the external torque reduction request value to a threshold value; and
    means for setting a wheel-slip-occurring value based on the results of the means for comparing.

15. The control system of claim 13 where the means for adjusting the throttle progression curve further comprises:
    means for calculating a pending throttle area modifier; and
    means for updating a previous throttle area modifier value with the pending throttle area modifier.

16. The control system of claim 15 further comprising:
    means for storing the updated throttle area modifier in nonvolatile memory.

17. The control system of claim 15 further comprising:
    means for basing the calculated pending throttle area modifier on a previous throttle area modifier value and a current pedal position; and
    means for limiting the calculated pending throttle area modifier to be not less than a predetermined minimum value.

18. The control system of claim 15 where the means for updating the previous throttle area modifier further comprises:

if the pending throttle area modifier is less than the previous throttle area modifier, means for updating the previous throttle area modifier value with the pending throttle area modifier value;

if the pending throttle area modifier is not less than the previous throttle area modifier, means for updating the throttle area modifier if the pedal position is less than a first predetermined threshold value; and if the pending throttle area modifier is not less than the previous throttle area modifier and the pedal position is not less than the first predetermined threshold value, means for updating the throttle area modifier if both the pedal position is greater than a second predetermined threshold value and the engine vacuum is less than a third predetermined threshold value.

19. The control system of claim 15 where the means for adjusting the throttle progression curve further comprises:

if slip is not occurring according to the means for comparing, means for basing the calculated throttle area modifier on a previous throttle area modifier value plus a predetermined incremental increase value.

20. The control system of claim 19 where the means for updating the previous throttle area modifier further comprises:

means for updating the throttle area modifier if the pedal position is less than a first predetermined threshold value;

if the pedal position is not less than the first predetermined threshold value, means for updating the throttle area modifier if both the pedal position is greater than a second predetermined threshold value and the engine vacuum is less than a third predetermined threshold value.

21. The control system of claim 13 further comprising:

means for limiting the means for adjusting to only one adjustment per acceleration cycle.

22. The control system of claim 21 further comprising:

means for enabling another adjustment cycle of the means for adjusting after the acceleration pedal has returned to a rest position.

23. The control system of claim 13 further comprising:

means for determining if slip has occurred for a predetermined period of time prior to adjusting the throttle progression curve.

24. The control system of claim 13 further comprising:

means for setting a predetermined minimum throttle progression curve.

* * * * *